US010698703B2

(12) United States Patent
Walker (10) Patent No.: US 10,698,703 B2
(45) Date of Patent: *Jun. 30, 2020

(54) MOBILE APPLICATION MANAGEMENT BY RUN-TIME INSERTION OF A SUBSTITUTE APPLICATION CLASS LOADER INTO A MOBILE APPLICATION PROCESS

(71) Applicant: Citrix Systems, Inc., Fort Lauderdale, FL (US)

(72) Inventor: James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/145,927

(22) Filed: Sep. 28, 2018

(65) Prior Publication Data

US 2020/0104145 A1 Apr. 2, 2020

(51) Int. Cl.
  *G06F 9/44* (2018.01)
  *G06F 9/451* (2018.01)
  *G06F 8/20* (2018.01)
  *G06F 8/34* (2018.01)
  *G06F 3/0484* (2013.01)

(52) U.S. Cl.
  CPC .......... *G06F 9/451* (2018.02); *G06F 3/04842* (2013.01); *G06F 8/24* (2013.01); *G06F 8/34* (2013.01)

(58) Field of Classification Search
  CPC ... G06F 9/451; G06F 8/24; G06F 8/34; G06F 3/04842
  See application file for complete search history.

(56) References Cited

U.S. PATENT DOCUMENTS 6,944,846 B2 9/2005 Ryzhov
8,578,443 B2 11/2013 Narain et al.
(Continued)

OTHER PUBLICATIONS

P.C. Castro et al., Runtime adaptive multi-factor authentication for mobile devices, IEEE Explore, Nov. 14, 2013, retrieved online on Feb. 27, 2020, pp. 1-17. Retrieved from the Internet: <URL: https://ieeexplore.ieee.org/stamp/stamp.jsp?>. (Year: 2013).*
(Continued)

*Primary Examiner* — Hanh Thi-Minh Bui
(74) *Attorney, Agent, or Firm* — BainwoodHuang (57) ABSTRACT

Starting execution of a mobile application on a mobile device causes the mobile application to invoke an initialization method that i) creates a substitute application class loader, and ii) replaces a default application class loader for the mobile application with the substitute application class loader. The substitute application class loader processes a request for a requested object class defined by the mobile application by returning, instead of the requested object class, an alternate object class that is different from the requested object class and that is defined by mobile application management logic also executing on the mobile device. Continued execution of the mobile application on the mobile device includes performing at least one mobile application management action using the alternate object class returned by the substitute application class loader.

19 Claims, 6 Drawing Sheets

(56) References Cited

U.S. PATENT DOCUMENTS

| | | |
|---|---|---|
| 8,892,876 B1 | 11/2014 | Huang et al. |
| 9,396,325 B2 | 7/2016 | Kendall |
| 9,405,723 B2 | 8/2016 | Koneru et al. |
| 9,436,371 B2 | 9/2016 | Simon et al. |
| 9,501,315 B2 | 11/2016 | Desai et al. |
| 9,542,552 B2 | 1/2017 | Peterson |
| 9,639,329 B2 * | 5/2017 | Raundahl Gregersen ................... G06F 8/31 |
| 10,191,723 B2 * | 1/2019 | Gulkis .................... G06F 9/445 |

OTHER PUBLICATIONS

Mearian, Lucas, "What is app wrapping? One way to more secure mobile apps," Computerworld, IDG Communications, Inc., 2018, Published on Jul. 21, 2017 <<www.computerworld.com/article/3209907/mobile-apps/app-wrapping-the-key-to-more-secure-mobile-app-management.html<< accessed Nov. 5, 2018, 8 pages.

* cited by examiner

MOBILE APPLICATION MANAGEMENT BY RUN-TIME INSERTION OF A SUBSTITUTE APPLICATION CLASS LOADER INTO A MOBILE APPLICATION PROCESS

TECHNICAL FIELD

The present disclosure relates generally to mobile application management of mobile applications on a mobile device in a networked computer system, and more specifically to providing mobile application management of a mobile application on a mobile device through run-time insertion of a substitute application class loader into a mobile application process.

BACKGROUND

As it is generally known, a mobile application (sometimes referred to as an "app") is a computer program designed to run on a mobile device such as a smartphone, tablet or watch. Mobile devices are often sold with some mobile applications that are bundled as pre-installed software. Mobile applications that are not preinstalled may be distributed through distribution platforms known as app stores. Mobile applications can also be installed manually, for example by running an Android application package on an Android device.

The widespread adoption and use of mobile applications has given rise to the need for Mobile Application Management (MAM) systems that automatically control specific mobile application functions in response to a set of mobile application management policies. For example, management of mobile applications may be important in an environment in which the mobile applications are deployed by a business enterprise to a user's mobile device, and in which the mobile applications may potentially be used to access and use secure resources belonging to the business enterprise. In such an operational environment, the enterprise may desire that access to and/or use of the enterprise's secure resources be permitted from mobile applications only in accordance with a set of mobile application management policies that are defined by the enterprise.

SUMMARY

Previous approaches to providing MAM support in mobile applications have included application wrapping based techniques. Application wrapping is performed by running an application wrapping program on a previously compiled mobile application, prior to installation and execution of a modified version of the mobile application on a mobile device. The application wrapping program automatically identifies and modifies all the parts of the mobile application that need to be modified to support a corresponding MAM management service, prior to installation of the mobile application. Each specific MAM management service provides its own application wrapping program, and running that application wrapping program on a mobile application modifies the mobile application such that the resulting modified mobile application can be managed using the corresponding MAM management service. For example, a mobile application modified by an application wrapping program corresponding to the Intune management service provided by Microsoft Corporation is capable of being managed by the Intune management service. However, in previous systems, running the application wrapping program corresponding to a specific management service on a mobile application has typically resulted in a significantly modified mobile application, with a modified class hierarchy, modified method names, modified method invocations, etc., Such a heavily modified application may only be capable of being managed using the management service corresponding to the application wrapping program used to wrap the application. This result runs counter to some customers' need to manage mobile applications using different management services at different times, and/or to use multiple manage services at the same time. Another problem with application wrapping in previous systems is caused by the use of a single application wrapping program to wrap different mobile applications. In such circumstances, the application wrapping program may inject all potentially needed MAM functionality into every application that it is run on, regardless of whether specific types of MAM functionality are needed by specific individual applications. In some cases, the total amount of MAM program code added by the application wrapping program to cover the management needs of all mobile applications may be as much as 10 megabytes. This "one size fits all" approach to including management support can automatically add a large amount of unneeded MAM program code to an application during the application wrapping process. For example, in some previous systems, an application wrapping program may automatically add MAM program code that supports policy-based control of access to a mobile device's camera to every program it is applied to. However, some mobile applications do not even include program code that uses the camera of the mobile device, and for those applications the camera management program code automatically added by the application wrapping program is unneeded. In addition to unneeded program code, previous MAM application wrapping programs may automatically add unneeded native libraries, and unneeded resources, such as strings that are only required in MAM user interfaces that are not used when managing the specific application being wrapped.

In order to avoid problems of previous application wrapping approaches, Software Development Kit (SDK) based techniques have also been used to provide MAM capabilities in mobile applications. In previous SDK based approaches, the application developer manually modifies the source code of the mobile application during application development to include MAM capability at each and every management inflection point. MAM functionality that may potentially be needed by the developer is made available to the developer outside the mobile application program code, within files of an SDK corresponding to a specific MAM management service. A MAM system standard provided by the MAM management service instructs the developer as to how the mobile application should be modified during the development process to support the MAM management service. For example, in order to modify a mobile application so that it can be managed by the Intune management service, the developer must follow a programming standard corresponding to the Intune service. The developer determines the specific MAM program code and/or resources from the SDK that are actually needed to support MAM for the specific mobile application, and modifies the mobile application such that when the modified mobile application is compiled and made ready for installation, only the MAM program code and/or resources that are needed by that specific mobile application are included in the executable version of the modified mobile application that is installed on the mobile device. In this way, an SDK based approach may avoid the inclusion of unneeded program code and/or resources in the installable version of the mobile application would typically occur when using application wrapping based techniques. However, learning and applying complex MAM system standards for modifying a mobile application can be a difficult and time consuming task for a developer, and introduce significant delays to the development process. Some previous MAM system standards have required extensive changes to mobile applications, and even changing the entire code structure of the mobile application, changing the names of all their objects and methods, and/or invoking specific helper functions before and after specific functions within the mobile application. In addition, extensive changes to the mobile application made by the developer to meet the requirements of some previous MAM system standards have made it difficult or even impossible to make additional changes to the mobile application to comply with a second MAM system standard, so that the mobile application can be managed by multiple MAM systems.

To address the above described and other shortcomings of previous technical solutions, new technology is described herein for providing mobile application management of a mobile application. In the disclosed technology, an operating system of a mobile device starts execution of the mobile application on the processing circuitry of the mobile device. In response to the operating system of the mobile device starting execution of the mobile application on the processing circuitry of the mobile device, the mobile application invokes an initialization method. The initialization method i) creates a substitute application class loader, and ii) replaces a default application class loader for the mobile application with the substitute application class loader.

In response to the replacement of the default application class loader with the substitute application class loader, the substitute application class loader processes at least one request, e.g. from the operating system or the mobile application, for at least one requested object class that is defined by the mobile application. The substitute application class loader processes the request at least in part by returning, instead of the requested object class, an alternate object class that is different from the requested object class and that is defined by mobile application management logic also executing on the processing circuitry of the mobile device. The operating system then continues execution of the mobile application on the processing circuitry of the mobile device using the alternate object class returned by the substitute application class loader. Continued execution of the mobile application includes performing at least one mobile application management action using the alternate object class returned by the substitute application class loader.

In some embodiments, performing the mobile application management action using the alternate object class returned by the substitute application class loader may include creating at least one instance of the alternate object class returned by the substitute application class loader, and executing the instance of the alternate object class returned by the substitute application class loader on the processing circuitry of the mobile device.

In some embodiments, the operating system of the mobile device starts execution of the mobile application on the processing circuitry of the mobile device at least in part by creating a process that is used by the operating system to execute the mobile application on the processing circuitry of the mobile device. The default class loader may be assigned, by the operating system prior to invocation of the initialization method by the mobile application, to the process used by the operating system to execute the mobile application on the processing circuitry of the mobile device. In such embodiments, the initialization method may replace the default application class loader with the substitute application class loader at least in part by assigning the substitute application class loader to the process used by the operating system to execute the mobile application on the processing circuitry of the mobile device.

In some embodiments, the initialization method may use Java reflection to assign the substitute application class loader to the process used by the operating system to execute the mobile application on the processing circuitry of the mobile device.

In some embodiments, the initialization method may be the first program code of the mobile application that is executed when execution of the mobile application is started by the operating system of the mobile device.

In some embodiments, the substitute application class loader may process requests for a requested object class by returning an alternate object class that operates as a proxy for the requested object class, and is operable to intercept every call made to methods of the requested object class. In such embodiments, the alternate object class may process the intercepted calls by i) redirecting the intercepted calls to alternate methods within the mobile application management logic, ii) calling through to an original implementation of the requested object class in the mobile application, and/or iii) preventing the processing of the intercepted calls entirely.

In some embodiments, the substitute application class loader may process requests for a first requested object class by returning a first alternate object class instead of the first requested object class. The substitute class loader may then process requests for all requested object classes other than the first requested object class by returning stub alternate object classes that do not access any data. At least one instance of the first alternate object class may then be created. The mobile application management action then performed while continuing execution of the mobile application on the processing circuitry of the mobile device may then include, by execution of the instance of the first alternate object class, or by execution of program logic in the first alternate object class without instantiation of an object, changing a state of data that is accessible by the mobile application from a first state to a second state.

In some embodiments, changing the state of the data that is accessible by the mobile application from the first state to the second state may include or consist of performing a decryption operation on the data that is accessible by the mobile application.

In some embodiments, changing the state of the data that is accessible by the mobile application from the first state to the second state may include or consist of performing an encryption operation on the data that is accessible by the mobile application.

In some embodiments, the first requested object class may be an object class that creates windows in a graphical user interface of the mobile device. In some embodiments in which the operating system of the mobile device is an Android™ operating system, the first requested object class may be the Activity object class that is defined by the Android™ operating system.

In some embodiments, performing at least one mobile application management action using the alternate object class may include locking the mobile application by displaying at least one mobile application management window in a graphical user interface of the mobile device. Displaying the mobile application management window may block user interaction with the mobile application.

In some embodiments, locking the mobile application by displaying the mobile application management window may further include causing the mobile application management window to become a currently active window within the graphical user interface of the mobile device.

In some embodiments, the mobile application management window displayed in the graphical user interface of the mobile device may include at least one authentication user interface that authenticates a user of the mobile device.

In some embodiments, performing the mobile application management action using the alternate object class may include causing the mobile application to access a managed resource over a secure communication channel.

In some embodiments, the disclosed technology may include automatically inserting, into the mobile application by an application wrapping program after the mobile application has been compiled, a call to the initialization method that is invoked by the mobile application when execution of the mobile application is started on the processing circuitry of the mobile device.

Embodiments of the technology described herein may provide significant improvements over previous solutions. For example, embodiments of the disclosed technology may be provided that allow a Software Development Kit (SDK) based solution to be used to provide mobile application management, thus avoiding shortcomings associated with previous application wrapping approaches. In embodiments that use an SDK based approach, the application developer need only modify the source code of the mobile application during application development to include a single call to an initialization method in order to provide mobile application management capabilities in the mobile application. The substitute class loader created by the initialization method provides control over the mobile application to support mobile application management, without requiring the application developer to extensively modify the mobile application program code during the development process. In addition, in some SDK based embodiments, the application developer may expressly indicate the specific mobile application management logic (e.g. run-time library from the SDK) that is needed to manage the mobile application, thus eliminating the inclusion of potentially large amounts of unneeded mobile application logic with the mobile application.

In embodiments in which the initialization method is the first program code of the mobile application that is executed after execution of the mobile application is started by the operating system, the state of data accessed by the mobile application may be changed prior to access of any data by mobile application program code other than the program code within the initialization method. In this way, a database or the like that is accessed by the mobile application may be decrypted, or encrypted, prior to any manipulation of the data in the database by program code outside the initialization method. For example, in an operational environment in which a mobile application management policy indicates that data accessed by the mobile application should not be encrypted beyond a global encryption that is automatically performed by the operating system and/or other components of the mobile device on all data that is stored within the mobile device, so that performance of the mobile application can be improved by eliminating additional encryption/decryption by the mobile application during normal operation, and where the data accessed by the mobile device was previously encrypted by the mobile application in addition to the global encryption performed on all data stored within the mobile device, embodiments of the disclosed technology may advantageously perform a decryption operation on the data that is accessed by the mobile application before any manipulation of the data by the mobile application outside of the initialization method can be performed, and such that continued execution of the mobile application after execution of the initialization method can proceed using only data that is not additionally encrypted by the mobile application, thereby eliminating the need for the mobile application to perform ongoing encryption and decryption during normal operation, and thereby improving the overall performance of the mobile application as a result.

The small amount of modifications to the mobile application that are required by the disclosed technology also allows the mobile application to be further modified to support management by multiple MAM systems, either by additional SDK based modifications and/or by modifications that may be accomplished by additional application wrapping procedures.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different figures. The elements of the drawings are not necessarily drawn to scale, emphasis instead being placed upon illustrating the principles of the various embodiments.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. Support for all such combinations, permutations and/or variations is considered to exist in this document.

As described herein, execution of a previously installed mobile application is started by an operating system of the mobile device on the processing circuitry of a mobile device. The operating system starts execution of the mobile application on the processing circuitry of the mobile device. In response to the operating system of the mobile device starting execution of the mobile application on the mobile device, the mobile application invokes an initialization method that i) creates a substitute application class loader, and ii) replaces a default application class loader for the mobile application with the substitute application class loader. In response to the replacement of the default application class loader with the substitute application class loader, the substitute application class loader processes requests from the operating system and/or the mobile application for object classes that are defined by the mobile application. The substitute application class loader processes at least some of the requests it receives by returning, instead of the requested object class, an alternate object class that is defined by mobile application management logic also executing on the mobile device. Continued execution of the mobile application includes performing at least one mobile application management action using the alternate object class returned by the substitute application class loader.

Figure 1:
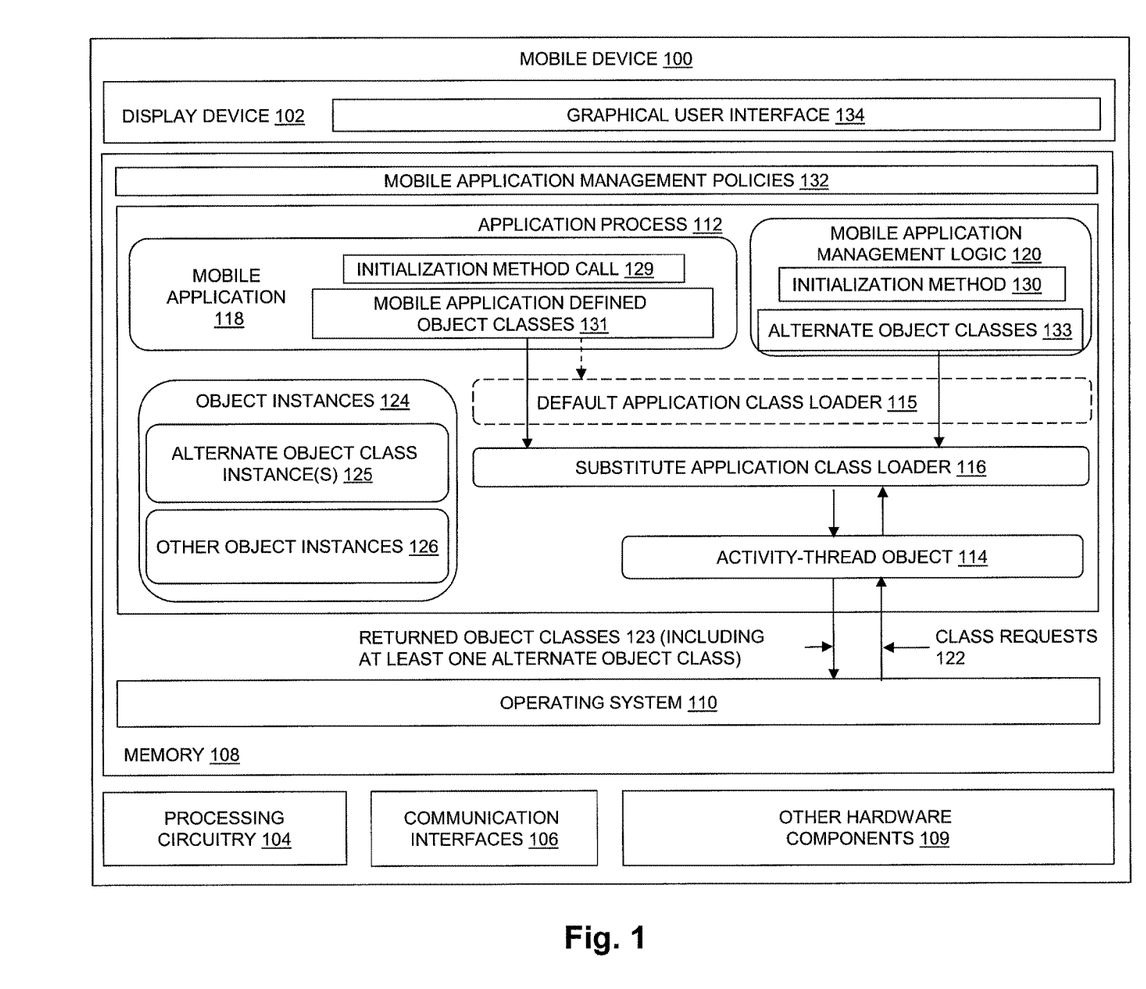
FIG. 1 is a block diagram showing a first example of components in some embodiments of the disclosed technology.

FIG. 1 is a block diagram showing a first example of components in some embodiments of the disclosed technology. As shown in FIG. 1, a Mobile Device 100 includes a Display Device 102, Processing Circuitry 104, Communication Interfaces 106, Memory 108, and Other Hardware Components 109. Mobile Device 100 may, for example, be a smart phone, tablet computer, e-book reader, or some other type of mobile computing device.

Display Device 102 may include or consist of an electronic visual display. A touch screen input device may be layered on top of the Display Device 102. A Graphical User Interface 134 for Mobile Device 100 may be displayed by Display Device 102.

Processing Circuitry 104 may include or consist of one or more Central Processing Units (CPUs) and associated hardware circuitry operable to execute program code stored in Memory 108.

Communication Interfaces 106 may include or consist of one more antennas and transmitter and receiver circuitry, that is operable to transmit and receive data over one or more wireless communication networks, including but not limited to one or more cellular networks, and other types of wireless communication networks, such as wireless Local Area Networks (LANs) or the like.

Memory 108 may include or consist of some combination of Random Access Memory (RAM) and Read Only Memory (ROM). In some embodiments, Memory 108 may include some amount of non-volatile solid state flash memory, which may be used at least in part to store the Operating System 110.

Other Hardware Components 109 may include or consist of various hardware devices and associated circuitry that is also contained in Mobile Device 100, such as a camera, microphone, speaker, etc.

Memory 108 stores program code components (e.g. instructions) that execute on Processing Circuitry 102. The program code is illustrated by Operating System 110 and Application Process 112. In some embodiments, the Operating System 110 may, for example, be embodied as the Android™ operating system developed by Google LLC. The Application Process 112 may include an Activity-Thread Object 114, a Default Application Class Loader 115 that is replaced by a Substitute Application Class Loader 116, Mobile Application 118, and Mobile Application Management Logic 120.

Mobile Application 118 includes software objects of a mobile application (or "app"), and was previously installed on the Mobile Device 100, e.g. by downloading of an Android Package (pkg) that contains Mobile Application 118 from a remotely located app store or the like into Memory 108. Mobile Application 118 may be embodied as any specific type of mobile application, such as, for example, a secure electronic mail application, or some other specific type of mobile application.

Mobile Application Management Logic 120 includes software objects that operate when executed to perform mobile application management actions. Mobile Application Management Logic 120 may, for example, be part of a Software Development Kit (SDK) that was used by a developer during the development of Mobile Application 118. Mobile Application Management Logic 120 may be a specific portion of the SDK that was expressly indicated by the developer for inclusion with Mobile Application 118 when Mobile Application 118 was distributed and installed. For example, Mobile Application Management Logic 120 may include or consist of a run-time library that is a subset of the SDK, and that is included as part of an Android Package (pkg) that is used to distribute and install Mobile Application 118. Accordingly, Mobile Application Management Logic 120 may have been downloaded to Mobile Device 100 together with Mobile Application 118 when Mobile Application 118 was installed onto Mobile Device 100, e.g. as a run-time library contained in an Android Package (pkg) used to install Mobile Application 118 onto Mobile Device 100.

Mobile Application Management Logic 120 may include program code that, when executed, performs various specific types of mobile application management (MAM) actions. Such MAM actions may, for example, include MAM actions that change the state of data (e.g. a database) that is accessed by Mobile Application 118 prior to Mobile Application 118 accessing any data, MAM actions that at least temporarily lock Mobile Application 118 in response to a mobile application management policy (e.g. in response to a policy violation), MAM actions that otherwise control the use of various features within Mobile Application 118, MAM actions that otherwise control access by Mobile Application 118 to various specific local managed resources that are present on the Mobile Device 100, and/or to various specific remote managed resources that are located on other devices (e.g. on one or more remote servers, etc.), MAM actions that monitor the performance and usage of Mobile Application 118, MAM actions that perform user authentication prior to allowing Mobile Application 118 to perform specific functions and/or access specific managed resources, MAM actions that wipe (delete) data belonging to Mobile Application 118 in response to a policy violation, MAM actions that redirect communications between Mobile Application 118 and one or more remote resources to a secure communication channel (e.g. to a Virtual Private Network (VPN)), and/or other specific types of MAM actions.

During operation of some embodiments, a trigger event causes Operating System 110 to start execution of Mobile Application 118 on Processing Circuitry 104. Various specific trigger events may cause Operating System 110 to start execution of Mobile Application 118. For example, a user of Mobile Device 100 may cause Operating System 110 to start execution of Mobile Application 118 by pressing on an icon representing Mobile Application 118 in Graphical User Interface 134. Alternatively, another application may cause Operating System 110 to start execution of Mobile Application 118 by initiating communication with Mobile Application 118.

The Operating System 110 starts execution of Mobile Application 118 at least in part by creating Application Process 112. Operating System 110 then uses Application Process 112 to execute Mobile Application 118 on Processing Circuitry 104. For example, in embodiments in which Operating System 110 is the Android operating system, Operating System 110 creates a separate Linux process for each one of multiple mobile applications that may execute or are executing on Processing Circuitry 104, so that each application has its own process. Accordingly, in embodiments in which Operating System 110 is the Android operating system, Application Process 112 may be a Linux process.

In response to Operating System 110 starting execution of Mobile Application 118 on Processing Circuitry 104, Mobile Application 118 invokes an initialization method. In the example of FIG. 1, Mobile Application 118 includes Initialization Method Call 129 that, when executed, invokes Initialization Method 130. Initialization Method Call 129 may, for example, be located in the first callable method of Mobile Application 118 that is invoked by the Operating System 110 when execution of Mobile Application 118 is started. In such embodiments, the Initialization Method 130 may be the first program code of the Mobile Application 118 that is executed when execution of the Mobile Application 118 is started by Operating System 110.

In embodiments in which Operating System 110 is the Android operating system, the first callable method of Mobile Application 118 may be an attachBaseContext function that is called by Operating System 110 to set up a base context when Mobile Application 118 is started. In such embodiments, Initialization Method Call 129 may be added to the attachBaseContext function of Mobile Application 118 by the developer during application development, while developing Mobile Application 118 on a separate and independent development computer system, prior to compilation of Mobile Application 118 and installation of Mobile Application 118 on Mobile Device 100. Alternatively, similarly prior to installation of Mobile Application 118 on Mobile Device 100, an application wrapping program may be executed on the separate and independent development system. The application wrapping program may automatically insert, into Mobile Application 118 after Mobile Application 118 has been compiled, Initialization Method Call 129 into Mobile Application 118, e.g. by automatically inserting Initialization Method Call 129 into the attachBaseContext function of Mobile Application 118.

Invoking Initialization Method 130 through the Initialization Method Call 129 causes Initialization Method 130 to execute on Processing Circuitry 104. Initialization Method 130 is part of Mobile Application Management Logic 120. When executed, Initialization Method 130 creates Substitute Application Class Loader 116, and replaces Default Application Class Loader 115 with Substitute Application Class Loader 116. In some embodiments, replacing Default Application Class Loader 115 with Substitute Application Class Loader 116 may include assigning Substitute Application Class Loader 116 to Application Process 112. For example, prior to Initialization Method 130 being called and executed, Operating System 110 may have already assigned Default Application Class Loader 115 to Application Process 112. In some embodiments, Initialization Method 130 may use Java Reflection to replace Default Application Class Loader 115 with Substitute Application Class Loader 116. For example, Operating System 110 may create Application Process 112 in part by creating a main execution thread for Application Process 112, shown by Activity-Thread Object 114 in FIG. 1. Operating System 110 may also assign Default Application Class Loader 115 to Application Process 112 by assigning Default Application Class Loader 115 to Activity-Thread Object 114 prior to Initialization Method 130 being invoked. When Initialization Method 130 is later invoked, Initialization Method 130 may use Java Reflection (e.g. calls to the Java Reflection Application Programming Interface (API)) to find Activity-Thread Object 114, and then modify a field in Activity-Thread Object 114 that indicates the application class loader for Activity-Thread Object 114, so that the field points to Substitute Application Class Loader 116 instead of to Default Application Class Loader 115. In this way, some embodiments of Initialization Method 130 may use Java Reflection to replace Default Application Class Loader 115 with Substitute Application Class Loader 116 by assigning Substitute Application Class Loader 116 to Application Process 112 at run time, while the Mobile Application 118 is executing on the Processing Circuitry 104.

In response to the replacement of Default Application Class Loader 115 with Substitute Application Class Loader 116, Substitute Application Class Loader 116 processes Class Requests 122 that are received by Substitute Class Loader 116 from Operating System 110 and/or Mobile Application 118. Each one of Class Requests 122 is a request for an object class to be loaded that is defined by Mobile Application 118, e.g. for one of Mobile Application Defined Object Classes 131. Operating System 110 loads the Returned Object Classes 123 it receives from the Substitute Application Class Loader 116, and may subsequently use the loaded object classes to create instances of the loaded object classes. As shown in FIG. 1, Default Application Class Loader 115 is operable to return only object classes defined by Mobile Application 118, e.g. object classes in Mobile Application Defined Object Classes 131. In contrast, Substitute Application Class Loader 116 is operable to return object classes defined by Mobile Application 118 (e.g. Mobile Application Defined Object Classes 131), and/or alternate object classes that are defined by Mobile Application Management Logic 120 (e.g. Alternate Object Classes 133). When Substitute Application Class Loader 116 receives a request to load an object class into Operating System 110 (e.g. one of the Class Requests 122), Substitute Application Class Loader 116 makes a determination based on the specifically requested object class, and on one or more MAM policies that are stored in Mobile Application Management Policies 132, as to whether to return the actual requested object class from Mobile Application Defined Object Classes 131, or to return an alternate object class from Alternate Object Classes 133. Substitute Application Class Loader 116 processes at least one of the Class Requests 122 for an object class that is defined by the Mobile Application 118 (e.g. one of Mobile Application Object Classes 131), by returning, instead of the requested object class that is defined by the Mobile Application 118, an alternate object class that i) is defined by Mobile Application Management Logic 120 (e.g. one of Alternate Object Classes 133), and ii) is different from the specifically requested object class defined by Mobile Application 118.

After loading Returned Object Classes 123, Operating System 110 may use one or more of the loaded object classes to create Object Instances 124. Each one of Object Instances 124 may, for example, may be created in response to a request received by the Operating System 110 from either Mobile Application 118 or Mobile Application Management Logic 120 to instantiate an object. Object Instances 124 may include Alternate Object Class Instance(s) 125, and Other Object Instances 126. Alternate Object Class Instance(s) 125 may include at least one instance of an alternate object class returned by Substitute Application Class Loader 116 in Returned Object Classes 123. Other Object Instances 126 may include one or more instances of object classes defined by the Mobile Application 118, e.g. one or more instances of object classes from Mobile Application Defined Object Classes 131 that are included in Returned Object Classes 123. After loading Returned Object Classes 123, Operating System 110 continues using Application Process 112 to execute Mobile Application 118 on Processing Circuitry 104. The continued execution of Mobile Application 118 includes performing at least one mobile application management action using at least one of the alternate object classes returned by Substitute Application Class Loader 116. For example, performing at least one mobile application management action using at least one of the alternate object classes returned by Substitute Application Class Loader 116 may include creating Alternate Object Class Instance(s) 125 using one or more of the alternate object classes returned by Substitute Application Class Loader 116, and executing Alternate Object Class Instances 125 on Processing Circuitry 104 to perform at least one mobile application management action. Alternatively, performing at least one mobile application management action using at least one of the alternative object classes returned by Substitute Application Class Loader 116 may include performing the mobile application management action using one or more of the alternative object classes returned by Substitute Application Loader 116 without creating an instance of the alternative object classes, e.g. using one or more static methods. For example, an alternative object class returned by Substitute Application Loader 116 may only be used as a static reference, and no instance of that alternative object class may be allowed to be created.

In some embodiments, the Substitute Application Class Loader 116 may process requests in Class Requests 122 for one or more specific requested object classes by returning an alternate object class that operates as a proxy for the requested object class, and that intercepts every call made to any method of the requested object class. The alternate object class returned by Substitute Application Class Loader 116 may then process each of the intercepted calls by either i) redirecting the intercepted call to an alternate method within the Mobile Application Management Logic 120, ii) passing the intercepted call through to an original implementation of the requested object class in the Mobile Application 118, or iii) preventing the processing of the intercepted call entirely.

Figure 2:
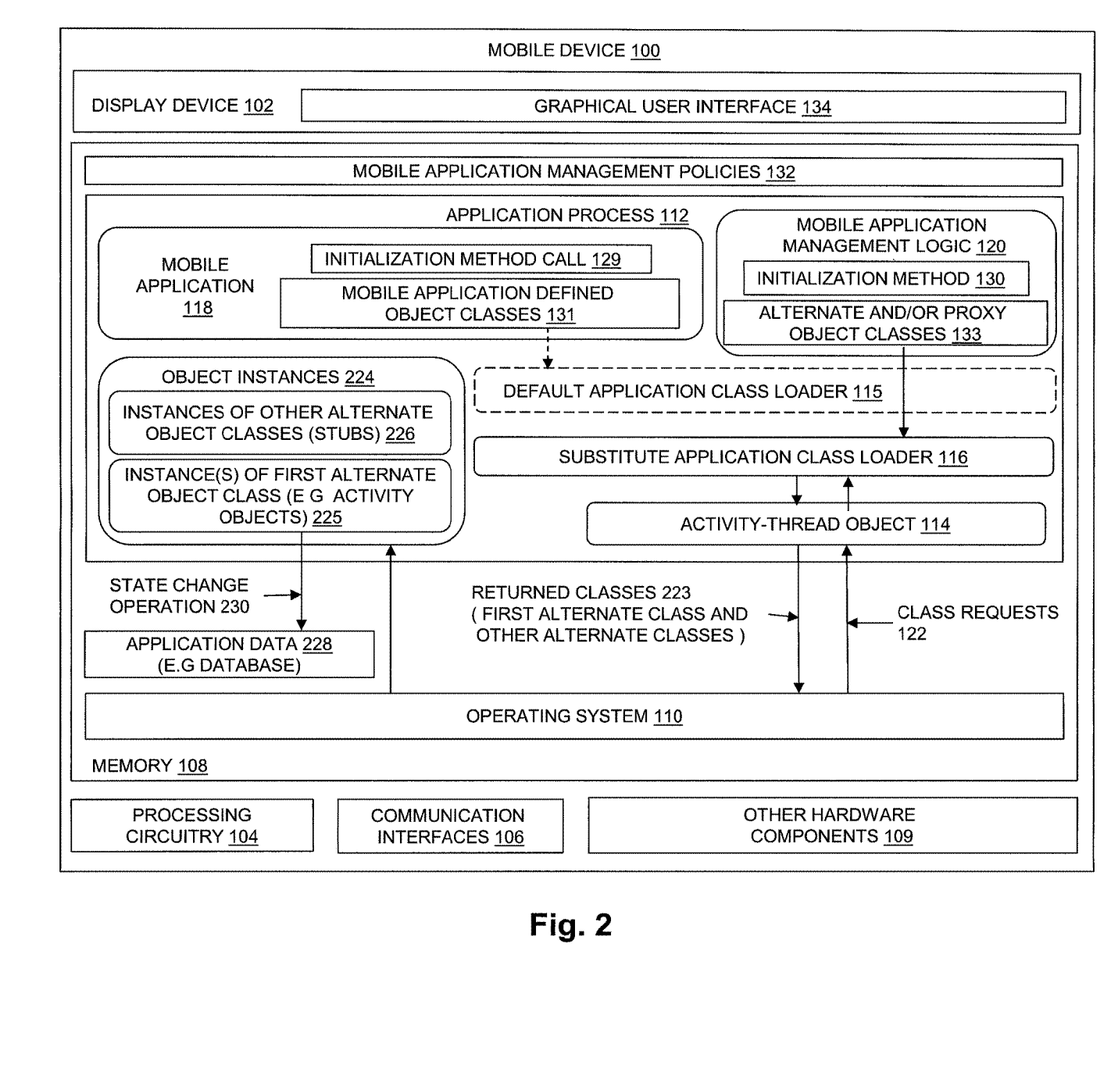
FIG. 2 is a block diagram showing a second example of components in some embodiments of the disclosed technology.

FIG. 2 is a block diagram showing a second example of components in some embodiments of the disclosed technology. In the example of FIG. 2, the Substitute Application Class Loader 116 returns only alternate object classes from Alternate Object Classes 133. Substitute Application Class Loader 116 identifies requests in Class Requests 122 for a specific requested object class referred to herein for purposes of explanation as a "first" requested object class. The Substitute Application Class Loader 116 processes requests for the first requested object class by returning, instead of the first requested object class, a corresponding alternate object class from Alternate Object Classes 133, referred to herein for purposes of explanation as the "first" alternate object class. For all other requests in Class Requests 122, i.e. for all requests for any requested object class other than the first requested object class, the Substitute Application Class Loader 116 returns "stub" alternate object classes from Alternate Object Classes 133. In other words, for each requested object class other than the first requested object class, the Substitute Application Class Loader 116 returns a corresponding one of the Alternate Object Classes 133 that is a "stub" object class. The stub object classes all define objects that perform no data accesses. Accordingly, the methods of the stub object classes themselves perform no accesses to application data of the Mobile Application 118 after they are loaded, and if the Operating System 110 subsequently uses any of the stub object classes returned by Substitute Application Class Loader 116 to instantiate one or more objects in Object Instances 224, the resulting stub object instances perform no accesses to application data of the Mobile Application 118. The application data of Mobile Application 118 is shown for purposes of illustration by Application Data 228, which may for example include or consist of a local database in Memory 108, and/or a remotely located database, that is exclusively accessed by Mobile Application 118. Instances of stub object classes are shown for purposes of illustration by Instances of Other Object Classes 226.

When execution of the Mobile Application 118 continues on Processing Circuitry 104, one or more object instances may be created by the Operating System 110 using the first alternate object class, and may be executed to perform a mobile application management action that includes or consists of performing a State Change Operation 230 on Application Data 228. Alternatively, program logic in the first alternate object class itself may be invoked to perform the mobile application management action that includes or consists of performing State Change Operation 230 on Application Data 228, without the creation of any object instances of the first alternate object class. For purposes of illustration, the object instances that may be created by the Operating System 110 using the first alternate object class are shown by Instance(s) of First Alternate Object Class 225. The State Change Operation 230 performed by execution of Instance(s) of First Alternate Object Class 225, or alternatively by execution of program logic in the first alternate object class itself without any object instantiation (e.g. using one or more static methods), changes a state of Application Data 228 from a first state to a second state, prior to any part of Mobile Application 118 accessing Application Data 228. Because no other object classes returned by the Substitute Application Class Loader 116, or any object instances created therefrom, access Application Data 228 while the first alternate object class or one or more Instances of First Alternate Object Class 225 perform State Change Operation 230, there is no risk that Application Data 228 will be accessed by any program code in Mobile Application 118 before the state of all of Application Data 228 has been changed to the second state. After the state of all of Application Data 228 is changed to the second state, program logic in the first alternate object class or in the Instance(s) of First Alternative Object Class 225 may restart Mobile Application 118. When Mobile Application 118 is restarted, Initialization Method 130 or Substitute Application Class Loader 116 may detect that Application Data 228 has been changed to the second state. In response to detecting that Application Data 228 has been changed to the second state, Initialization Method 130 may not assign Substitute Application Class Loader 116 to Application Process 112, or Substitute Application Class Loader 116 may process subsequently received class requests by returning non-stub object classes that are defined by Mobile Application 118, e.g. one or more of the Mobile Application Defined Object Classes 131, thus allowing Mobile Application 118 to subsequently execute normally albeit with the state of Application Data 228 having been changed from the first state to the second state.

In some embodiments or configurations, changing the state of Application Data 228 from the first state to the second state may include or consist of performing a decryption operation on Application Data 228. For example, one or more of Mobile Application Management Policies 132 may indicate that Application Data 228 should not be encrypted by Mobile Application 118 in addition to a global encryption that is automatically performed by the Operating System 110 and/or Other Hardware Components 109 on all data that is stored in Memory 108. By eliminating such additional encryption, performance of the Mobile Application 118 may be improved because no additional encryption/decryption by Mobile Application 118 needs to be performed during normal operation. In response to such a policy or policies, changing the state of Application Data 228 from the first state to the second state may include or consist of performing a decryption operation on Application Data 228 in the case where Application Data 228 was previously encrypted by both the global encryption and by Mobile Application 118. The resulting Application Data 228 would still be encrypted by the global encryption, but not additionally encrypted by Mobile Application 118.

In some embodiments or configurations, changing the state of Application Data 228 from the first state to the second state may include or consist of performing an encryption operation on Application Data 228. For example, one or more of Mobile Application Management Policies 132 may indicate i) that Application Data 228 should be encrypted by Mobile Application 118 in addition to any global encryption that may automatically performed by the Operating System 110 and/or Other Hardware Components 109 on all data that is stored in Memory 108, or ii) that Application Data 228 should be encrypted by Mobile Application 118 because no such global encryption exists, in order to improve the security of Mobile Application 118. In response to such a policy or policies, changing the state of Application Data 228 from the first state to the second state may include or consist of performing an encryption operation on Application Data 228 in the case where Application Data 228 was not previously encrypted by Mobile Application 118. The resulting Application Data 228 would then be encrypted at least by Mobile Application 118.

In some embodiments, the first requested object class may be an object class that creates windows in a graphical user interface of the mobile device. For example, in embodiments in which the Operating System 110 is an Android operating system, Mobile Application 118 may be made up of four different classes of objects: Activity, Service, Broadcast Receiver, and Content Provider. The Activity, Service, Broadcast Receiver, and Content Provider classes are defined by the Android operating system. Objects of the Activity class in Mobile Application 118 are responsible for interacting with the user of the Mobile Device 100, and operate to create and otherwise manage windows within the Graphical User Interface 134 through which the user can interact with Mobile Application 118. Objects of the Service class in Mobile Application 118 run in the background to perform work for remote processes. Objects of the Broadcast Receiver class in Mobile Application 118 allow Mobile Application 118 to respond to broadcast announcements. Objects of the Content Provider class in Mobile Application 118 manage application data that is shared with other application. In some embodiments in which the operating system of the mobile device is an Android™ operating system, the object class referred to herein as the first requested object class may be the Activity object class that is defined by the Android™ operating system, the first alternate class may be an alternate Activity object class in Alternate Object Classes 133, and the Instances of the First Alternate Object Class 225 may be instances of the alternate Activity object class loaded from Alternate Object Classes 133. Further in such embodiments, the stub alternate object classes may be stub alternate object classes loaded from Alternate Object Classes 133 and correspond to the Service, Broadcast Receiver, and Content Provider classes that are also defined by the Android operating system.

Figure 3:
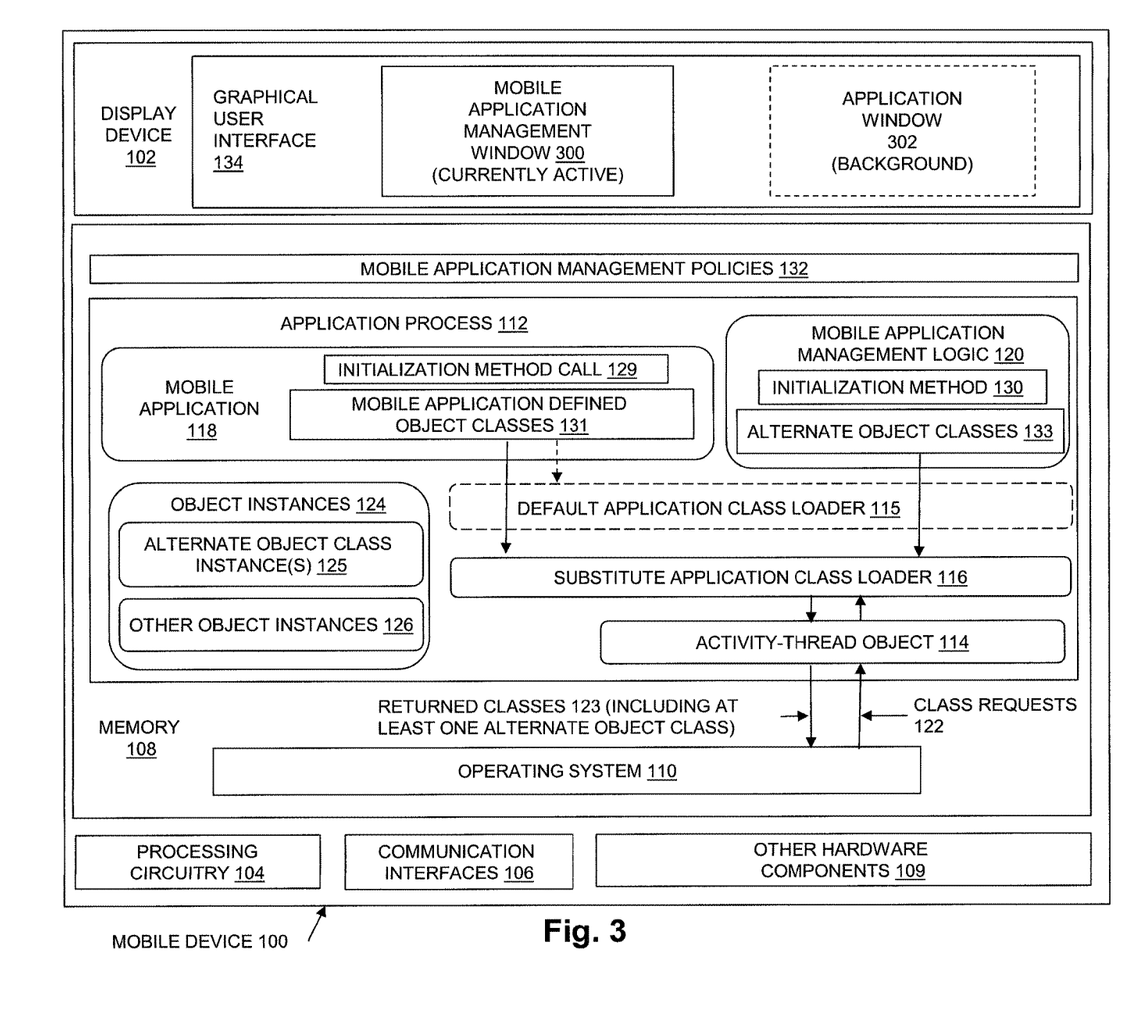
FIG. 3 is a block diagram showing a third example of components in some embodiments of the disclosed technology.

FIG. 3 is a block diagram showing a third example of components in some embodiments of the disclosed technology. As illustrated in FIG. 3, performing at least one mobile application management action using the alternate object class returned by the Substitute Application Class Loader 116 may include at least temporarily locking the Mobile Application 118, e.g. by displaying Mobile Application Management Window 300 in Graphical User Interface 134, such that Mobile Application Management Window 300 blocks user interaction with the Mobile Application 118.

For example, Graphical User Interface 134 may include a windowing system in which only a single window has focus at any given time. In such embodiments, the window in Graphical User Interface 134 that currently has focus is the only window that can currently receive input from the user. The window that has focus in Graphical User Interface 134 is referred to as the currently active window. Windows other than the currently active window in Graphical User Interface 134 are referred to as background windows. Background windows cannot receive input from the user. In some embodiments or configurations, only the currently active window in Graphical User Interface 134 is visible, and all background windows are completely obscured by the currently active window. In other embodiments or configurations, a background window or windows may be partly or wholly visible at the same time as the currently active window.

In some embodiments, performing at least one mobile application management action using the alternate object class returned by the Substitute Application Class Loader 116 may include locking Mobile Application 118 at least in part by causing the Mobile Application Management Window 300 to become the currently active window within Graphical User Interface 134. By making Mobile Application Management Window 200 the currently active window, the mobile application management action prevents user interaction with any windows that are generated by Mobile Application 118, such as Application Window 302, since all other windows in the Graphical User Interface 102 are moved to the background of Graphical User Interface 134 when Mobile Application Management Window 300 is made the currently active window.

In some embodiments, Mobile Application Management Window 300 may include or consist of at least one authentication user interface that authenticates a user of the Mobile Device 100.

In some embodiments, Mobile Application Management Window 300 may include or consist of a dialog box graphical control element, at least one progress bar graphical control element, and/or one or more other specific graphical control elements that lock the Mobile Application 118 while performing a mobile application management action.

In some embodiments, violation of a mobile application management policy stored in Mobile Application Management Policies 132 may result in performing at least one mobile application management action using the alternate object class returned by the Substitute Application Class Loader 116 that locks the Mobile Application at least in part by causing Mobile Application Management Window 300 to be displayed as the currently active window in Graphical User Interface 134. In some cases, depending on the policy that is violated, the Mobile Application Management Window 300 may block any further user interaction with the Mobile Application 118, and display a message indicating that Mobile Application 118 is locked due to violation of the policy.

In some embodiments, one or more policies in Mobile Application Management Policies 132 may indicate that some or all of the functions of Mobile Application 118 cannot be used under certain circumstances, e.g. when the Mobile Device 100 has been rooted. As it is generally known, rooting is a process that allows users of mobile devices running the Android operating system to attain privileged control (known as root access) over various Android subsystems. In some embodiments, performing at least one mobile application management action using the alternate object class returned by the Substitute Application Class Loader 116 may include checking to determine whether Mobile Device 100 has been rooted. In response to one or more policies in Mobile Application Management Policies 132 that restrict use of Mobile Application 118 when Mobile Device 100 has been rooted, and upon detecting that Mobile Device 100 has in fact been rooted, performing at least one mobile application management action using the alternate object class returned by the Substitute Application Class Loader 116 may include preventing one or more calls from Operating System 110 to functions in Mobile Application 118 that are not permitted when Mobile Device 100 has been rooted from being delivered to Mobile Application 118.

Figure 4:
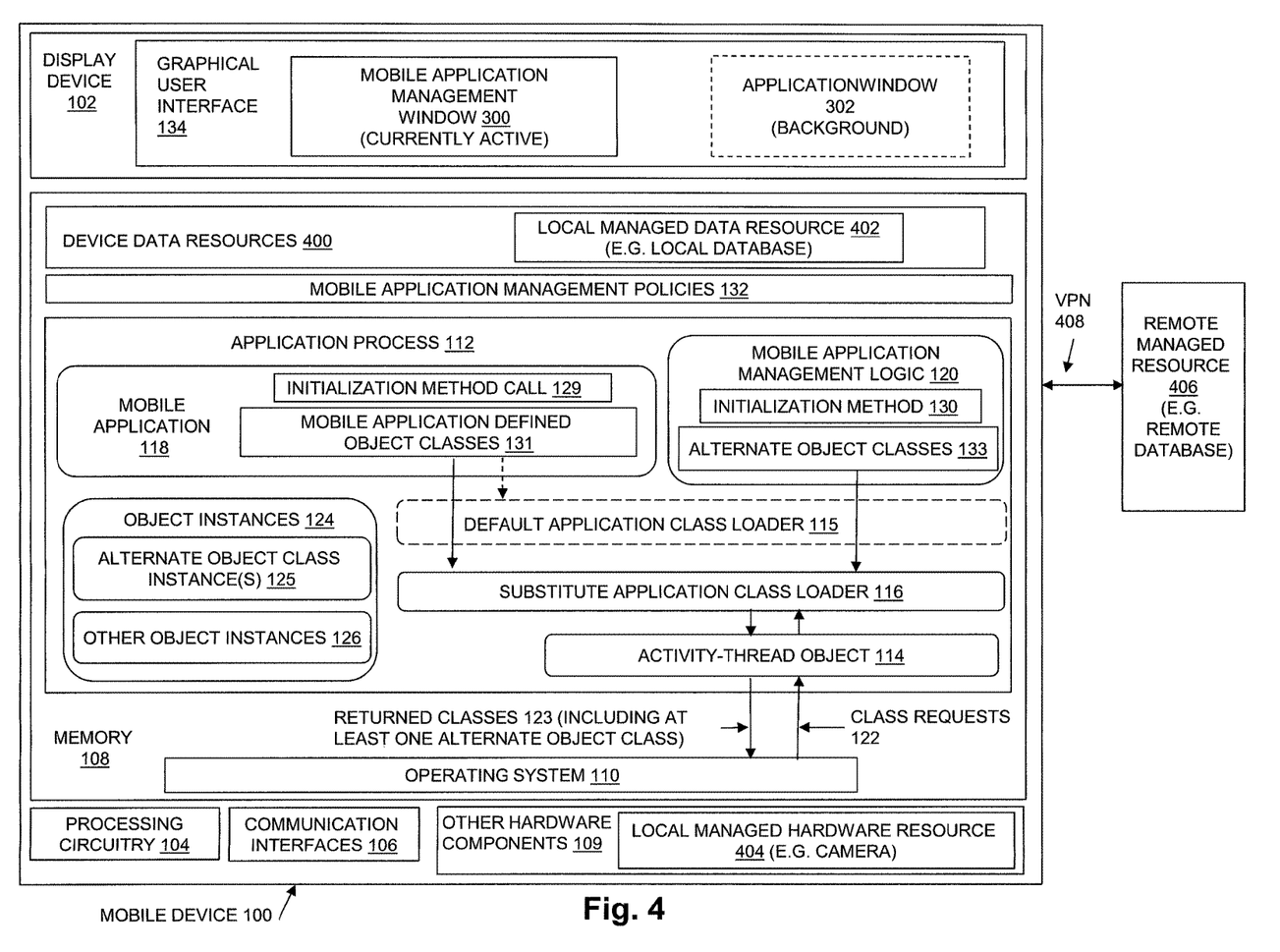
FIG. 4 is a block diagram showing a fourth example of components in some embodiments of the disclosed technology.

FIG. 4 is a block diagram showing a fourth example of components in some embodiments of the disclosed technology. As shown in FIG. 4, the disclosed technology may be embodied to provide control over how or whether Mobile Application 118 accesses various types of managed resources. For example, the disclosed technology may be embodied to control access by Mobile Application 118 to i) a Local Managed Data Resource 402, such as a local data base stored in Memory 108, ii) a Local Managed Hardware Resource 404, such as a camera or other hardware device within the Mobile Device 100, and/or iii) a Remote Managed Resource 406, such as a remote database or the like.

In some embodiments, one or more policies in Mobile Application Management Policies 132 may indicate the user must be authenticated before access is granted to a managed resource (e.g. Local Managed Data Resource 302, Local Managed Hardware Resource 304, or Remote Managed Resource 306). In such embodiments, performing at least one mobile application management action using the alternate object class returned by the Substitute Application Class Loader 116 may include performing authentication of the user of Mobile Device 100 prior to allowing Mobile Application 118 to access the managed resource. Such authentication may, for example, be accomplished at least in part by displaying an authentication user interface including or consisting of one or more mobile application management windows, such as Mobile Application Window 300, in the Graphical User Interface 134, in order to obtain one or more authentication credentials (e.g. username, password, personal identification number, one time passcode, etc.) from the user of the Mobile Device 100.

In some embodiments, performing at least one mobile application management action using the alternate object class returned by Substitute Application Class Loader 116 may include or consist of ensuring that accesses by Mobile Application 118 to a remote managed resource, such as Remote Managed Resource 406, are performed over a secure communication channel. For example, performing at least one mobile application management action using the alternate object class returned by Substitute Application Class Loader 116 may cause communications between the Mobile Application 118 and the managed resource, such as data retrieval operations performed by Mobile Application 118 on the remote managed resource, to be performed over a Virtual Private Network (VPN) 408. In order to cause communications between the Mobile Application 118 and the managed resource to be performed over VPN 408, performing at least one mobile application management action using the alternate object class returned by Substitute Application Class Loader 116 may include initially establishing VPN 408 between the Mobile Device 100 and a remote server system that hosts the Remote Managed Resource 406.

Figure 5:
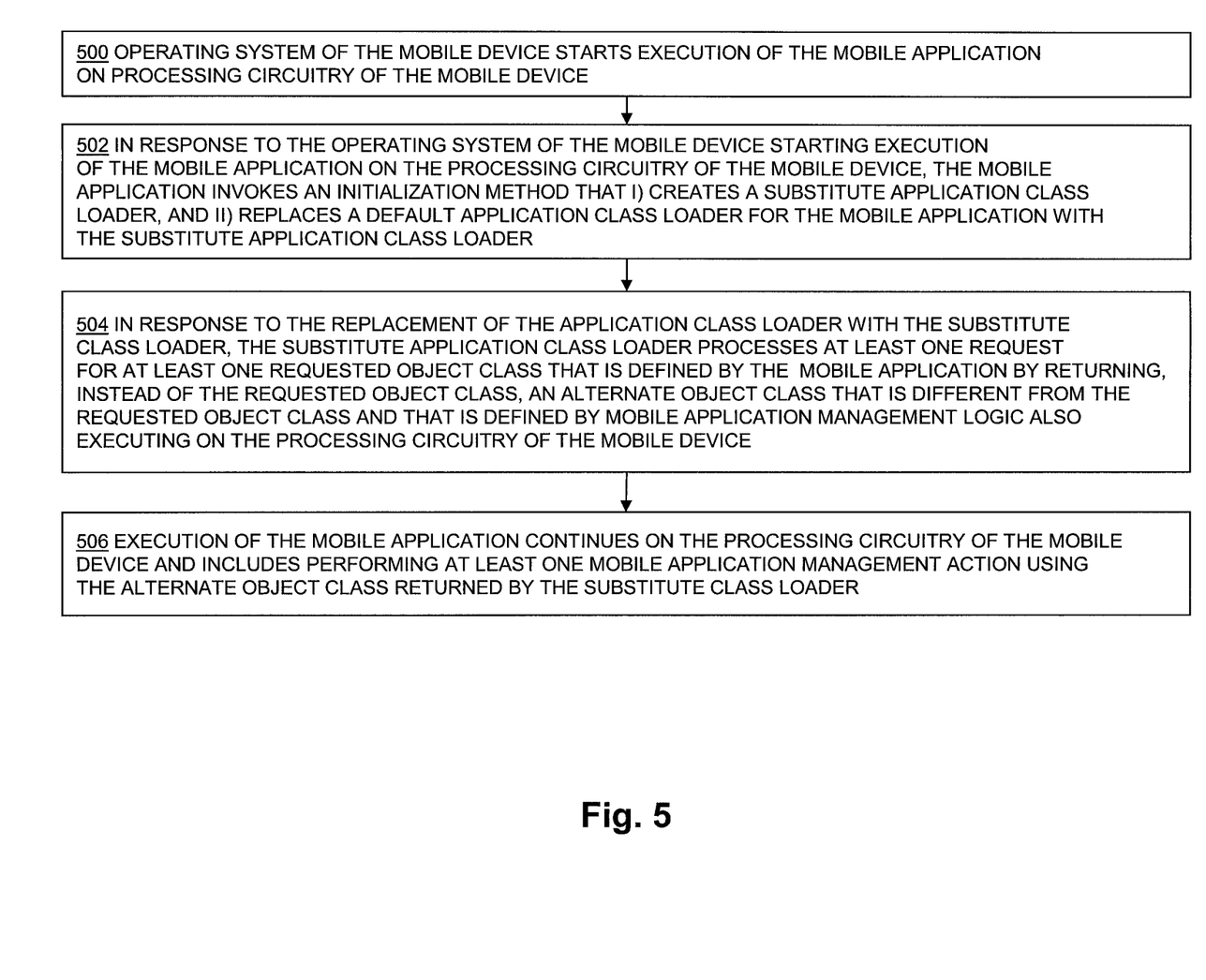
FIG. 5 is a first flow chart illustrating steps performed during operation of some embodiments of the disclosed technology.

FIG. 5 is a first flow chart illustrating steps performed during operation of some embodiments of the disclosed technology. As shown in FIG. 5, at step 500, the operating system of the mobile device starts execution of the mobile application on the processing circuitry of the mobile device.

At step 502, in response to the operating system of the mobile device starting execution of the mobile application on the processing circuitry of the mobile device, the mobile application invokes an initialization method that i) creates a substitute application class loader, and ii) replaces a default application class loader for the mobile application with the substitute application class loader. For example, in some embodiments, Java Reflection may be used to replace a default application class loader for a mobile application process with a newly created substitute application class loader at run time.

At step 504, in response to the application class loader having been replaced with the substitute class loader, the substitute application class loader processes at least one request received from the operating system or the mobile application to load at least one requested object class that is defined by the mobile application. Processing of the request includes returning, by the substitute application class loader to the operating system, instead of the requested object class, an alternate object class that is different from the requested object class. The returned alternate class is defined by mobile application management logic also executing on the processing circuitry of the mobile device.

At step 506, the mobile application continues executing on the processing circuitry of the mobile device. The continued execution of the mobile application includes performing at least one mobile application management action using the alternate object class returned by the substitute application class loader at step 504.

Figure 6:
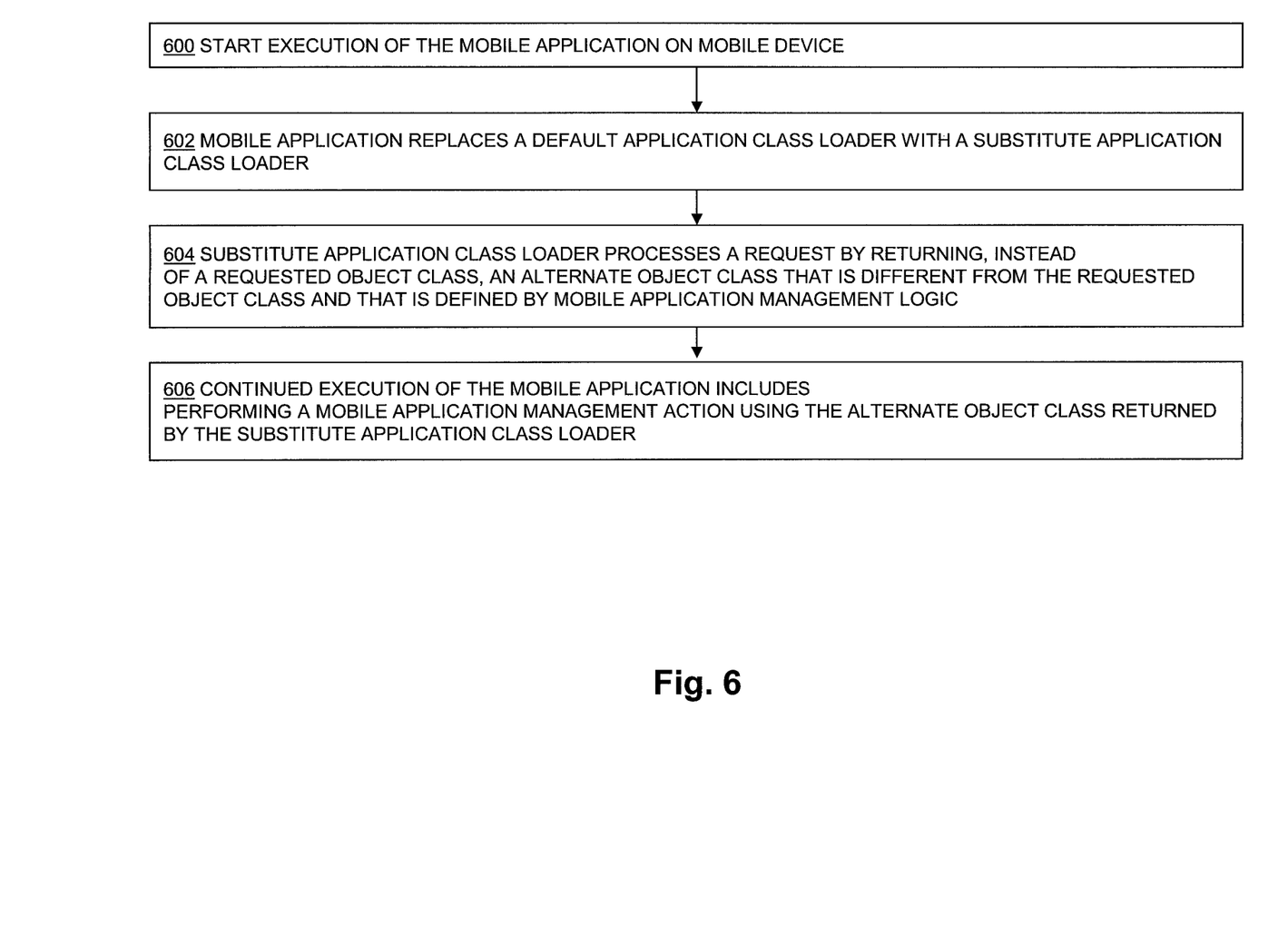
FIG. 6 is a second flow chart illustrating steps performed during operation of some embodiments of the disclosed technology.

FIG. 6 is a second flow chart illustrating steps performed during operation of some embodiments of the disclosed technology. At step 600, execution of the mobile application is started on mobile device. At step 602, the mobile application replaces a default application class loader with a substitute application class loader.

At step 604, the substitute application class loader processes a request to load a requested object class by returning, instead of the requested object class, an alternate object class that is different from the requested object class and that is defined by mobile application management logic.

At step 606, the alternate object class is used to perform a mobile application management action.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, functions of the embodiments illustrated herein may take the form of a computer program product embodied at least in part in one or more non-transitory computer readable storage medium(s) having computer readable program code stored thereon for causing one or more processors to carry out those functions.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that one or more of the block in such figures, and combinations of the blocks, can be implemented by computer program instructions. These computer program instructions may be executed on processing circuitry to form specialized hardware. The computer program instructions may further be loaded onto a mobile computing device to produce a machine, such that the instructions which execute on the mobile computing device create means for implementing the functions specified in the block or blocks. The computer program instructions may also be stored in a computer-readable memory that can direct a mobile computing device to function in a particular manner, such that the instructions stored in the computer-readable memory produce an article of manufacture including instruction means which implement the function specified in the block or blocks. The computer program instructions may also be loaded onto a mobile computing device to cause a series of operational steps to be performed to produce a computer implemented process such that the instructions which execute on the mobile computing device provide steps for implementing the functions specified in the block or blocks.

It will also be understood by those of ordinary skill in the art that modification to and variation of the illustrated embodiments may be made without departing from the inventive concepts described herein.

What is claimed is:

1. A method of providing mobile application management of a mobile application, comprising:

starting, by an operating system of a mobile device, execution of the mobile application on processing circuitry of the mobile device;

invoking, by the mobile application in response to the operating system of the mobile device starting execution of the mobile application on the processing circuitry of the mobile device, an initialization method, wherein the initialization method i) creates a substitute application class loader, and ii) replaces a default application class loader for the mobile application with the substitute application class loader;

processing, by the substitute application class loader in response to the replacement of the default application class loader with the substitute class loader, at least one request, for at least one requested object class that is defined by the mobile application, at least in part by returning, instead of the requested object class, an alternate object class that i) is different from the requested object class, and ii) is defined by mobile application management logic also executing on the processing circuitry of the mobile device, wherein the alternate object class returned by the substitute application class loader operates as a proxy for the requested object class, and intercepts every call made to methods of the requested object class, and wherein the alternate object class returned by the substitute application class loader processes at least one intercepted call to a method of the requested object class by redirecting the intercepted call to an alternate method within the mobile application management logic; and continuing execution of the mobile application on the processing circuitry of the mobile device using the alternate object class returned by the substitute class loader, at least in part by performing at least one mobile application management action using the alternate object class returned by the substitute class loader.

2. The method of claim 1, wherein performing the mobile application management action using the alternate object class returned by the substitute application class loader includes:

creating at least one instance of the alternate object class returned by the substitute application class loader; and executing the instance of the alternate object class returned by the substitute application class loader on the processing circuitry of the mobile device.

3. The method of claim 2, further comprising:

wherein starting execution of the mobile application on the processing circuitry of the mobile device includes the operating system of the mobile device creating a process that is used by the operating system to execute the mobile application on the processing circuitry of the mobile device;

wherein the default class loader is assigned, by the operating system prior to invocation of the initialization method, to the process used by the operating system to execute the mobile application on the processing circuitry of the mobile device; and wherein the initialization method replaces the default application class loader with the substitute application class loader at least in part by assigning the substitute application class loader to the process used by the operating system to execute the mobile application on the processing circuitry of the mobile device.

4. The method of claim 3, wherein the initialization method uses Java Reflection to assign the substitute application class loader to the process used by the operating system to execute the mobile application on the processing circuitry of the mobile device.

5. The method of claim 4, wherein the initialization method is the first program code of the mobile application that is executed when execution of the mobile application is started by the operating system of the mobile device.

6. The method of claim 1, wherein the alternate object class returned by the substitute application class loader processes at least one intercepted call to a method of the requested object class by calling through to an original implementation of the requested object class in the mobile application.

7. The method of claim 1, wherein the alternate object class returned by the substitute application class loader processes at least one intercepted call to a method of the requested object class by preventing the intercepted call from being processed.

8. The method of claim 1, further comprising:
wherein the substitute application class loader processes requests for a first requested object class by returning a first alternate object class instead of the first requested object class;
wherein the substitute class loader processes requests for all requested object classes other than the first requested object class by returning stub alternate object classes, wherein the stub alternate object classes do not access any data; and
wherein performing at least one mobile application management action using the alternate object class returned by the substitute class loader includes changing a state of data that is accessible by the mobile application from a first state to a second state using the first alternate object class.

9. The method of claim 8, wherein changing the state of the data that is accessible by the mobile application from the first state to the second state comprises performing a decryption operation on the data that is accessible by the mobile application.

10. The method of claim 8, wherein changing the state of the data that is accessible by the mobile application from the first state to the second state comprises performing an encryption operation on the data that is accessible by the mobile application.

11. The method claim 8, wherein the first requested object class comprises an object class that creates windows in a graphical user interface of the mobile device.

12. The method of claim 11, wherein the operating system of the mobile device comprises an Android™ operating system; and
wherein the first requested object class comprises the Activity object class defined by the Android™ operating system.

13. The method of claim 1, wherein performing at least one mobile application management action using the alternate object class returned by the substitute application class loader comprises locking the mobile application at least in part by displaying at least one mobile application management window in a graphical user interface of the mobile device, and wherein displaying the mobile application management window blocks user interaction with the mobile application.

14. The method of claim 13, wherein locking the mobile application by displaying the mobile application management window further includes causing the mobile application management window to become a currently active window within the graphical user interface of the mobile device.

15. The method of claim 14, wherein the at least one mobile application management window displayed in the graphical user interface of the mobile device comprises at least one authentication user interface that authenticates a user of the mobile device.

16. The method of claim 1, wherein performing at least one mobile application management action using the alternate object class returned by the substitute application class loader comprises causing the mobile application to access a managed resource over a secure communication channel.

17. The method of claim 1, further comprising automatically inserting, into the mobile application by an application wrapping program after the mobile application has been compiled, a call to the initialization method that is invoked by the mobile application when execution of the mobile application is started on the processing circuitry of the mobile device.

18. A mobile device, comprising:
processing circuitry;
a memory storing program code, wherein the program code stored in the memory is executable on the processing circuitry, and wherein the program code, when executed by the processing circuitry, is configured and arranged to:
start, by an operating system of the mobile device, execution of the mobile application on the processing circuitry,
invoke, by the mobile application in response to the operating system of the mobile device starting execution of the mobile application on the processing circuitry of the mobile device, an initialization method, wherein the initialization method i) creates a substitute application class loader, and ii) replaces a default application class loader for the mobile application with the substitute application class loader,
process, by the substitute application class loader in response to the replacement of the default application class loader with the substitute class loader, at least one request, for at least one requested object class that is defined by the mobile application, at least in part by returning, instead of the requested object class, an alternate object class that i) is different from the requested object class, and ii) is defined by mobile application management logic also executing on the processing circuitry of the mobile device, wherein the alternate object class returned by the substitute application class loader operates as a proxy for the requested object class, and intercepts every call made to methods of the requested object class, and wherein the alternate object class returned by the substitute application class loader processes at least one intercepted call to a method of the requested object class by redirecting the intercepted call to an alternate method within the mobile application management logic, and
continue execution of the mobile application on the processing circuitry of the mobile device using the alternate object class returned by the substitute class loader, at least in part by performing at least one mobile application management action using the alternate object class returned by the substitute class loader.

19. A non-transitory computer readable medium storing program code for providing mobile application management of a mobile application, wherein the program code, when executed by processing circuitry of a mobile device, causes the processing circuitry to perform a method of:

starting, by an operating system of a mobile device, execution of the mobile application on processing circuitry of the mobile device;

invoking, by the mobile application in response to the operating system of the mobile device starting execution of the mobile application on the processing circuitry of the mobile device, an initialization method, wherein the initialization method i) creates a substitute application class loader, and ii) replaces a default application class loader for the mobile application with the substitute application class loader;

processing, by the substitute application class loader in response to the replacement of the default application class loader with the substitute class loader, at least one request for at least one requested object class that is defined by the mobile application, at least in part by returning, instead of the requested object class, an alternate object class that i) is different from the requested object class, and ii) is defined by mobile application management logic also executing on the processing circuitry of the mobile device, wherein the alternate object class returned by the substitute application class loader operates as a proxy for the requested object class, and intercepts every call made to methods of the requested object class, and wherein the alternate object class returned by the substitute application class loader processes at least one intercepted call to a method of the requested object class by redirecting the intercepted call to an alternate method within the mobile application management logic; and continuing execution of the mobile application on the processing circuitry of the mobile device using the alternate object class returned by the substitute class loader, at least in part by performing at least one mobile application management action using the alternate object class returned by the substitute class loader.

\* \* \* \* \*